United States Patent [19]

Wong et al.

[11] 4,181,588

[45] Jan. 1, 1980

[54] METHOD OF RECOVERING LEAD THROUGH THE DIRECT REDUCTION OF LEAD CHLORIDE BY AQUEOUS ELECTROLYSIS

[75] Inventors: Morton M. Wong; Frank P. Haver, both of Reno, Nev.

[73] Assignee: The United States of America as represented by the Secretary of the Interior, Washington, D.C.

[21] Appl. No.: 1,026

[22] Filed: Jan. 4, 1979

[51] Int. Cl.$^2$ ............................................. C25C 1/18
[52] U.S. Cl. .................................... 204/115; 204/117
[58] Field of Search .................................. 204/115, 117

[56] References Cited

U.S. PATENT DOCUMENTS

| | | | |
|---|---|---|---|
| 1,435,891 | 11/1922 | Christensen | 204/117 |
| 1,539,713 | 5/1925 | Christensen | 204/117 |
| 3,192,143 | 6/1965 | Roe et al. | 204/115 |
| 3,736,238 | 5/1973 | Kruesi et al. | 204/117 |
| 4,082,629 | 4/1978 | Milner et al. | 204/117 |

*Primary Examiner*—R. L. Andrews
*Attorney, Agent, or Firm*—William S. Brown; Donald A. Gardiner

[57] ABSTRACT

A method for recovering lead from lead chloride through aqueous electrolysis wherein the lead chloride is directly reduced to metallic lead on the cathode. The electrolyte may comprise liquor from the leaching of galena concentrates, which liquor includes ferrous chloride that is subsequently converted to ferric chloride during electrolysis and recycled for additional leaching.

5 Claims, 1 Drawing Figure

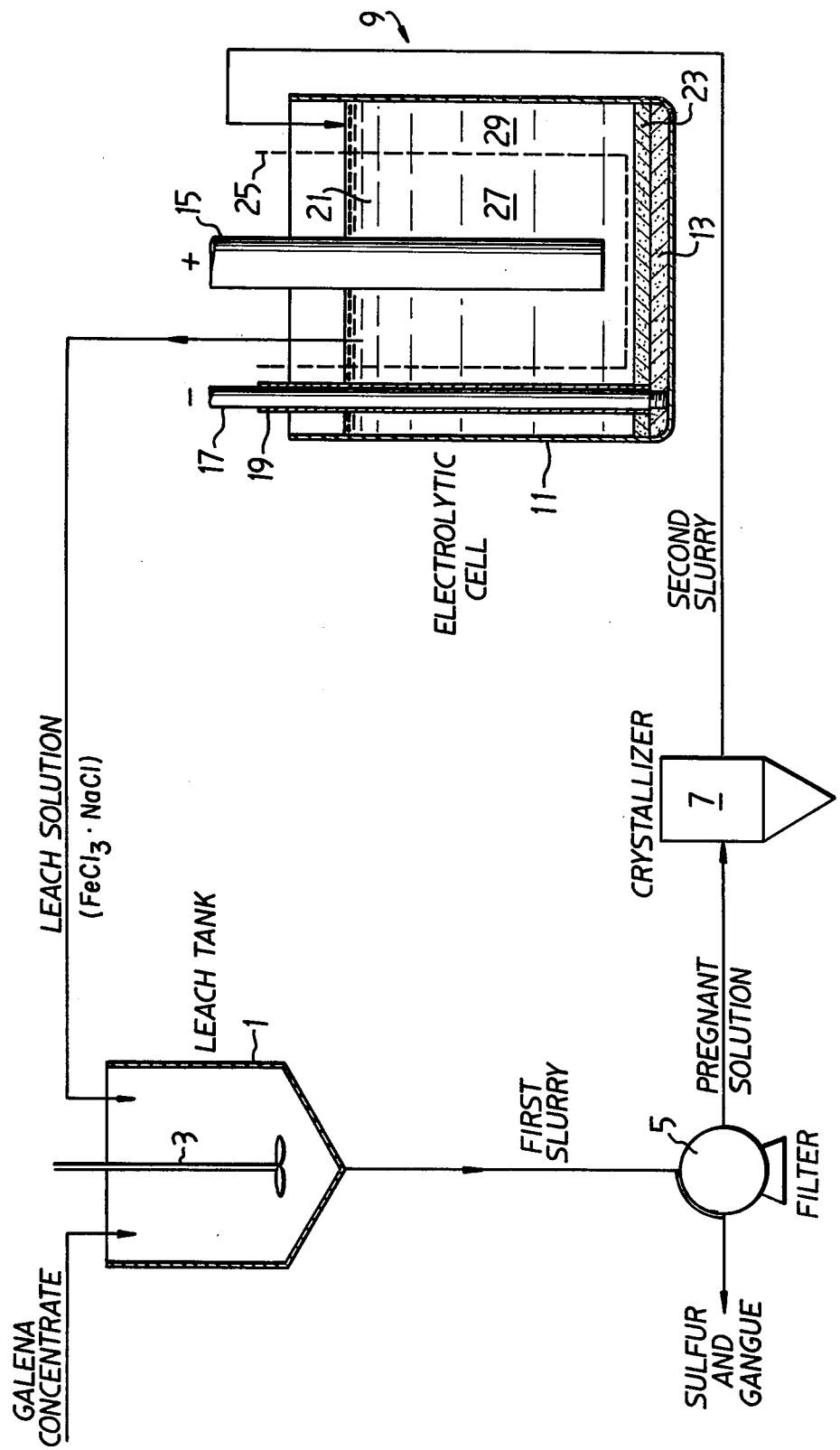

METHOD OF RECOVERING LEAD THROUGH THE DIRECT REDUCTION OF LEAD CHLORIDE BY AQUEOUS ELECTROLYSIS

BACKGROUND OF THE INVENTION

1. Field of the Invention

The present invention generally pertains to the recovery of metals from compounds thereof through electrolysis. More particularly, the invention relates to the direct reduction of lead chloride to lead metal through electrolysis with an aqueous electrolyte.

2. Description of the Prior Art

The industrial production of lead is generally achieved through conventional smelting methods. However, the use of lead smelters present serious environmental problems because they pollute the air through sulfur oxide and lead emissions.

An alternative method for lead production has been the use of fused-salt electrolysis of lead chloride. While this method is effective, the cost of the necessary equipment and installation is relatively high. Moreover, greater degrees of technical knowledge and skill are required to operate and maintain fused-salt electrolytic cells.

SUMMARY OF THE INVENTION

The present invention comprises an improvement over existing technology with respect to the recovery of lead from compounds thereof. This is achieved by utilizing an electrolytic cell containing an aqueous electrolyte wherein lead chloride in solid form is placed in direct contact with a cathode plate so that, upon the application of current, direct reduction of the lead chloride to metallic lead on the cathode plate is realized. A variety of aqueous electrolytes, including HCl, NaCl and $NH_4Cl$ may be utilized.

In a preferred embodiment, the aqueous electrolyte may comprise the filtered solution derived from the leaching of galena concentrates with ferric chloride. This electrolyte essentially includes a slurry of ferrous chloride in solution and lead chloride precipitate, the latter forming the precursor compound for reduction to metallic lead. The ferrous chloride is converted through electrolysis to ferric chloride which is then recycled to leach additional concentrate. Sodium chloride may be added to the leach solution to increase the solubility of lead chloride therein.

It is an object of the present invention to provide a simple and efficient method for recovering lead from compounds thereof.

It is another object of the invention to provide a method of recovering lead from lead chloride with a minimum of adverse effect on the environment.

It is yet another object of the invention to provide a method of electrolytically recovering lead from compounds thereof which is comparatively economical to practice and may be readily understood and utilized by those of ordinary skill in the art.

Other objects, features and advantages of the invention will be apparent from the following description of specific embodiments thereof, with reference to the accompanying drawing which forms a part of the specification.

BRIEF DESCRIPTION OF THE DRAWING

The single FIGURE of the drawing depicts a schematic representation of a system that may be utilized for the practice of the invention wherein the electrolyte is derived from solution used to leach lead compounds, with the spent electrolyte being recycled back to the leaching stage.

DETAILED DESCRIPTION OF THE PREFERRED EMBODIMENTS

With reference to the drawing, there is shown a system wherein the practice of the present invention may be accomplished for the production of lead from galena (PbS) concentrates.

A leach tank 1 having an appropriate agitation device 3, in the form of a stirrer or the like, receives galena concentrates and leach solution therein. The leach solution essentially comprises ferric chloride ($FeCl_3$) and sodium chloride (NaCl). The ferric chloride serves as the active leaching agent for deriving lead chloride ($PbCl_2$) from the galena concentrate. The sodium chloride is provided to increase the solubility of lead chloride in the aqueous leach solution. If necessary, the leach solution may be further acidified with hydrochloric acid (HCl).

Leaching of the galena concentrate in tank 1 is achieved at a temperature of approximately 95°–100° C., thereby producing a first slurry which comprises ferrous chloride ($FeCl_2$), lead chloride and sodium chloride in solution, with free sulfur and gangue in suspension. This first slurry is directed to a filter 5 which separates the sulfur and gangue from the slurry and isolates a pregnant solution comprising ferrous chloride, lead chloride and sodium chloride. This pregnant solution is then directed to a crystallizer 7 wherein it is cooled down to approximately 25° C., or about room temperature. During cooling, the lead chloride is precipitated out of solution and forms a second slurry with the ferrous chloride and sodium chloride, the latter compounds still being maintained in solution. This second slurry is sent from crystallizer 7 to an electrolytic cell 9 wherein the solid lead chloride serves as the precursor lead compound for reduction to metallic lead and the ferrous chloride-sodium chloride solution serves as the aqueous electrolyte.

Cell 9 includes a chamber 11 within which are disposed a cathode 13 and an anode 15. Cathode 13 is preferably in the form of a graphite plate that can be secured to the bottom of chamber 11. A graphite rod 17 is attached to cathode 13 and rises vertically therefrom for connecting cathode 13 to a direct current source. Rod 17 is enclosed within a tubular protective sleeve 19. The lower end of sleeve 19 abuts against the upper surface of cathode 13, while the upper end of sleeve 19 extends beyond the surface of an electrolyte bath 21 contained within chamber 11. Anode 15 may also be formed of graphite material and is preferably of a planar configuration. Since cathode 13 is supported in a stationary manner on the bottom of chamber 11, it is desirable to adjustably support anode 15 so that its spacing with respect to cathode 13 may be varied.

As indicated, the second slurry being sent into chamber 11 from crystallizer 7 comprises precipitated lead chloride in a solution of ferrous chloride and sodium chloride. The lead chloride is received at the bottom of chamber 11 and forms a layer 23 which is disposed in direct contact with cathode 13.

Chamber 11 preferably includes a porous diaphragm 25 which serves to partition off the interior of chamber 11 and define an anolyte compartment 27 and a catholyte compartment 29. Compartments 27 and 29 are isolated from each other, with communication therebetween being achieved solely through the porosity of diaphragm 25, the latter being made from any material well known in the art and found suitable for the intended purpose of this invention. Such materials include nylon, asbestos, paper, ceramics and various polymers, including polyvinyl chloride, polyethylene, polypropylene chloride, Teflon, and the like.

The second slurry, comprising solid lead chloride in a solution of ferrous chloride and sodium chloride, is directed into catholyte compartment 29 wherein, during electrolysis, direct reduction of lead chloride 23 to metallic lead on cathode 13 is achieved, with the ferrous chloride being simultaneously converted to ferric chloride. By virtue of the semipermeability of diaphragm 25, the resulting ferric chloride is maintained within anolyte compartment 27, along with the sodium chloride in solution, from which it may then be removed and recycled back into tank 1 for leaching additional galena concentrates. Diaphragm 25 thus functions to confine the ferric chloride within anolyte compartment 27 and prevents it from entering into catholyte compartment 29 wherein it not only attacks the metallic lead product, but also lowers the overall current efficiency of the electrolytic process.

Electrolysis with the described system is achieved at a temperature of approximately 25° C., or room temperature, and produces the following reaction at the cathode:

$$PbCl_2 + 2e^- = Pb(metal) + 2Cl^-$$

The following reactions also occur at the anode:

$$2Cl^- = Cl_2(gas) + 2e^-$$

$$2FeCl_2 + Ch_2(gas) = 2FeCl_3$$

Though the system shown in the drawing and described above comprises a preferred embodiment of the invention, it is understood that various modifications of this system are entirely possible while still maintaining the essential aspects of the invention. For example, other electrolytes may also be utilized and cell 9 can be structurally altered or operated in a batch manner. It is also possible to eliminate crystallizer 7 and send the hot pregnant solution from filter 5 directly into cell 9. In this situation, cooling of the solution to room temperature so that lead chloride can be precipitated must be effected within chamber 11 prior to initiation of electrolysis.

In order to provide a fuller understanding and appreciation of the objects and advantages of the invention, several examples and comparative data will be shown, with the same being intended as purely illustrative and in no manner limitative of the invention.

These examples were conducted while utilizing an electrolytic cell that consisted of a 1000 milliliter beaker containing a 1-inch diameter vertical graphite anode and a cathode assembly made up of a ¼-inch thick graphite plate cemented into the bottom of a truncated 800 milliliter beaker. A ⅜-inch graphite rod protected by a glass sleeve was provided for connecting the cathode to the direct current source. In all tests, 35 grams of solid lead chloride were placed on the cathode plate, forming a layer approximately ⅛ inch thick. 800 milliliters of solution were then added and electrolysis was performed under various conditions of bath compositions, temperatures, current densities, and electrode spacings. Each test was continued for 5 amp-hour, which is equivalent to converting about 75% of the lead chloride to metal. After electrolysis, the deposit was washed, dried, and melted at 450° C. under a salt cover (for example, a LiCl-KCl eutectic mixture), thereby coalescing the lead crystals into a bucket.

EXAMPLE 1

A series of tests were conducted with various electrolyte compositions utilizing a cathode current density of 15 amp/sq.ft., a temperature of 25° C., and an electrode spacing of one inch. The results of these tests demonstrate the effect of electrolyte composition on current efficiency and energy requirement of the system, which results are shown below in Table 1.

Table 1

| Electrolyte | Concentration, (wt-pct) | Cell voltage, (v) | Current efficiency, (%) | Energy requirement, (kwhr/lb) |
|---|---|---|---|---|
| HCl | 1.0 | 2.61 | 90.8 | 0.336 |
|  | 3.0 | 2.14 | 94.0 | .266 |
|  | 5.0 | 2.05 | 92.5 | .259 |
|  | 7.5 | 1.99 | 96.6 | .241 |
|  | 10.0 | 1.98 | 95.5 | .239 |
|  | 12.5 | 1.91 | 95.8 | .233 |
|  | 15.0 | 1.95 | 96.7 | .236 |
|  | 17.5 | 1.91 | 96.2 | .233 |
|  | 20.0 | 1.91 | 96.0 | .232 |
| NaCl | 1.0 | 4.15 | 93.9 | .517 |
|  | 3.0 | 3.11 | 95.3 | .382 |
|  | 5.0 | 2.70 | 95.4 | .331 |
|  | 7.5 | 2.52 | 96.8 | .305 |
|  | 10.0 | 2.37 | 97.0 | .286 |
|  | 12.5 | 2.31 | 97.6 | .277 |
|  | 15.0 | 2.26 | 97.2 | .272 |
|  | 17.5 | 2.23 | 97.8 | .267 |
|  | 20.0 | 2.20 | 97.6 | .264 |
| NH$_4$Cl | 1.0 | 3.39 | 94.9 | .418 |
|  | 3.0 | 2.61 | 92.3 | .333 |
|  | 5.0 | 2.37 | 91.4 | .304 |
|  | 7.5 | 2.25 | 94.3 | .279 |
|  | 10.0 | 2.17 | 93.8 | .271 |
|  | 12.5 | 2.12 | 92.9 | .267 |
|  | 15.0 | 2.05 | 90.3 | .266 |
|  | 17.5 | 2.02 | 94.4 | .251 |
|  | 20.0 | 2.00 | 90.5 | .259 |

EXAMPLE 2

A series of tests were conducted at various temperatures, utilizing an electrolyte concentration of 20% by weight each of HCl, NaCl, and NH$_4$Cl, with a cathode current density of 15 amp/sq.ft., and an electrode spacing of one inch. The results of these tests demonstrate the effect of temperature on current efficiency and energy requirement, which results are shown below in Table 2.

Table 2

| Electrolyte | Temperature (°C.) | Cell voltage, (V) | Current efficiency, (%) | Energy requirement, (kwhr/lb) |
|---|---|---|---|---|
| HCl | 25 | 1.91 | 96.0 | 0.232 |
|  | 50 | 1.80 | 91.4 | .231 |
|  | 75 | 1.73 | 87.7 | .230 |
| NaCl | 25 | 2.20 | 97.6 | .264 |
|  | 50 | 1.94 | 96.2 | .236 |
|  | 75 | 1.82 | 96.4 | .222 |
| NH$_4$Cl | 25 | 2.00 | 90.5 | .259 |
|  | 50 | 1.84 | 96.3 | .224 |
|  | 75 | 1.76 | 96.0 | .214 |

EXAMPLE 3

A series of tests were conducted at various cathode current densities while utilizing an electrolyte concentration of 20 weight percent, temperatures of 25° C. for HCl and 75° C. for NaCl and NH$_4$Cl, and an electrode spacing of one inch. The results of these tests show the effect of current density on current efficiency and energy requirement, which results are tabulated in the following Table 3.

Table 3

| Electrolyte | Current density, (amp/ft$^2$) | Cell voltage, (v) | Current efficiency, (%) | Energy requirement, (kwhr/lb) |
| --- | --- | --- | --- | --- |
| HCl | 15 | 1.91 | 96.0 | 0.232 |
| (25° C.) | 75 | 2.47 | 95.2 | .304 |
|  | 150 | 3.04 | 86.6 | .411 |
|  | 225 | 3.40 | 86.9 | .458 |
|  | 300 | 3.85 | 77.9 | .578 |
|  | 525 | 4.48 | 69.9 | .745 |
|  | 750 | 5.60 | 62.0 | 1.060 |
| NaCl | 15 | 1.82 | 96.4 | .222 |
| (75° C.) | 75 | 2.60 | 93.7 | .325 |
|  | 150 | 3.58 | 93.4 | .449 |
|  | 225 | 4.18 | 87.8 | .557 |
|  | 300 | 4.93 | 87.2 | .662 |
|  | 525 | 6.52 | 71.5 | 1.070 |
|  | 750 | 7.98 | 65.4 | 1.430 |
| NH$_4$Cl | 15 | 1.76 | 96.0 | .214 |
| (75° C.) | 75 | 2.36 | 95.3 | .290 |
|  | 150 | 2.91 | 86.8 | .392 |
|  | 225 | 3.57 | 86.7 | .482 |
|  | 300 | 3.99 | 89.9 | .519 |
|  | 525 | 5.02 | 64.7 | .907 |
|  | 750 | 6.43 | 55.8 | 1.350 |

EXAMPLE 4

A series of tests were made with various electrode spacings, utilizing an electrolyte concentration of 20 weight percent, a cathode current density of 15 amp/sq.ft., temperatures of 25° C. for HCl and 75° C. for NaCl and NH$_4$Cl. The results of these tests demonstrate the effect of electrode spacing on current efficiency and energy requirement, which results are shown below in Table 4.

Table 4

| Electrolyte | Electrode spacing, (inches) | Cell voltage, (v) | Current efficiency, (%) | Energy requirement, (kwhr/lb) |
| --- | --- | --- | --- | --- |
| HCl | 0.5 | 1.84 | 93.4 | 0.237 |
| (25° C.) | 1.0 | 1.91 | 96.0 | .232 |
|  | 2.0 | 1.91 | 95.8 | .233 |
|  | 3.0 | 1.98 | 94.3 | .246 |
|  | 4.0 | 2.04 | 93.2 | .256 |
| NaCl | .5 | 1.75 | 97.6 | .210 |
| (75° C.) | 1.0 | 1.82 | 96.4 | .222 |
|  | 2.0 | 1.89 | 97.6 | .227 |
|  | 3.0 | 1.98 | 97.8 | .239 |
|  | 4.0 | 2.14 | 95.9 | .261 |
| NH$_4$Cl | .5 | 1.71 | 99.9 | .200 |
| (75° C.) | 1.0 | 1.76 | 96.0 | .214 |
|  | 2.0 | 1.81 | 97.2 | .218 |
|  | 3.0 | 1.88 | 97.0 | .227 |
|  | 4.0 | 1.98 | 96.2 | .241 |

EXAMPLE 5

A series of tests were made with the leach solution from ferric chloride-brine leaching of galena concentrate as the electrolyte. The hot pregnant solution was cooled to room temperature to precipitate out as much PbCl$_2$ as possible. After precipitation, the liquor contained approximately 95 grams/liter FeCl$_2$, 230 grams/liter NaCl, and 25 grams/liter PbCl$_2$. Electrolysis was conducted at 25° C. The results of these tests as shown in the following Table 5 indicate the effect of current density on current efficiency and energy requirement, while using leach solution as the electrolyte and a one-inch electrode spacing at various current densities.

Table 5

| Current density (amp/ft$^2$) | Cell voltage (v) | Current efficiency, (%) | Energy requirement, (kwhr/lb) |
| --- | --- | --- | --- |
| 15 | 2.13 | 67.2 | 0.370 |
| 75 | 3.70 | 77.4 | .559 |
| 150 | 5.02 | 86.9 | .678 |
| 225 | 5.70 | 75.9 | .870 |
| 300 | 6.68 | 75.3 | 1.040 |
| 525 | 8.97 | 72.5 | 1.450 |
| 750 | 11.60 | 66.3 | 2.050 |

EXAMPLE 6

Tests were conducted under the same conditions as EXAMPLE 5 while utilizing a current density of 15 amp/sq.ft. and various electrode spacings to demonstrate the effect of electrode spacing on current efficiency and energy requirement while using leach solution as the electrolyte. The results of these tests are shown below in Table 6.

Table 6

| Electrode spacing (inches) | Cell voltage, (v) | Current efficiency, (%) | Energy requirement, (kwhr/lb) |
| --- | --- | --- | --- |
| 0.5 | 2.17 | 68.6 | 0.353 |
| 1.0 | 2.13 | 67.2 | .370 |
| 2.0 | 2.43 | 75.5 | .377 |
| 3.0 | 2.65 | 71.3 | .434 |
| 4.0 | 2.93 | 64.2 | .534 |

An analysis of the lead metal produced by electrolysis of lead chloride with the barren leach solution as the electrolyte along with ASTM specifications for corroding-grade lead, is provided below in Table 7.

Table 7

| | Purity of PbCl$_2$ and lead product, ppm | | |
| --- | --- | --- | --- |
| Element | PbCl$_2$ | Lead Product | ASTM Specifications |
| Antimony | ND | ND | 1 |
| Arsenic | ND | ND | <15 |
| Bismuth | ND | ND | <500 |
| Chlorine | — | ND | — |
| Copper | ND | 6 | <15 |
| Iron | 49 | 3 | <20 |
| Silver | ND | 7 | <15 |
| Sodium | 70 | ND | — |
| Sulfur | 33 | ND | — |
| Tin | ND | ND | 1 |
| Zinc | 21 | 4 | <15 |

ND - not detected (<1 ppm)
[1]Sb + Sn — <95 ppm

The electrolysis producing the results in Table 7 was conducted at 25° C., while utilizing a current density of 15 amp/sq.ft. and an electrode spacing of one inch. The electro-reduction was selective, with an appreciable amount of iron being present in the electrolyte and the PbCl$_2$ solids, but the lead metal product contained very little iron.

The date compiled above from the tests conducted under the indicated EXAMPLES demonstrate that lead metal may be produced from lead chloride by electrolysis in aqueous media with wide variations in electrolyte concentration, current density, temperature, and electrode spacing. It has been determined through testing that the preferred conditions comprise utilizing HCl, NaCl, NH$_4$Cl, or barren leach liquor as the electrolyte, a temperature of about 25° C. for HCl and leach solution and about 75° C. for NaCl and NH$_4$Cl, current densities ranging from approximately 15–300 amp/sq.ft., and an electrode spacing ranging from approximately ½ to 2 inches.

While the invention has been described and illustrated with reference to certain preferred operating parameters, those skilled in the art will appreciate that various modifications, changes, additions, omissions and substitutions may be made without departing from the spirit of the invention or the scope of the subjoined claims.

What is claimed is:

1. A method for recovering lead from galena concentrates comprising the steps of:

(a) leaching the concentrate with FeCl$_3$ solution to form a solution of PbCl$_2$ and FeCl$_2$, (b) precipitating the PbCl$_2$ in the solution of FeCl$_2$ to form a slurry of solid PbCl$_2$ in aqueous FeCl$_2$ solution, (c) charging the slurry to an electrolytic cell containing a cathode plate, whereby the precipitated PbCl$_2$ collects on the cathode plate, (d) subjecting the precipitated PbCl$_2$ to electrolysis in the presence of the aqueous FeCl$_2$ solution to reduce the PbCl$_2$ to metallic lead and convert the FeCl$_2$ to FeCl$_3$, and (e) recycling the resulting FeCl$_3$ solution from step (d) to step (a) for leaching additional concentrate.

2. The method of claim 1 wherein the leaching is conducted at a temperature of approximately 95°–100° C.

3. The method of claim 1 wherein the electrolysis is conducted at a temperature of approximately 25° C.

4. The method of claim 1 wherein the electrolysis is conducted in the presence of a porous diaphragm to isolate the FeCl$_2$ from the FeCl$_3$.

5. The method of claim 1 wherein the FeCl$_3$ used for leaching the concentrate includes NaCl to increase the solubility of PbCl$_2$ in aqueous solution.

* * * * *